United States Patent [19]

Burton

[11] 4,305,428

[45] Dec. 15, 1981

[54] SURGE ABSORBER

[75] Inventor: James A. Burton, Houston, Tex.

[73] Assignee: Hydril Company, Los Angeles, Calif.

[21] Appl. No.: 108,459

[22] Filed: Dec. 31, 1979

[51] Int. Cl.$^3$ ............................................. F16L 55/04
[52] U.S. Cl. ..................................... 138/30; 220/85 B
[58] Field of Search ................... 138/26, 30; 220/85 B; 418/181; 137/596.12, 596.2

[56] References Cited

U.S. PATENT DOCUMENTS

| | | | |
|---|---|---|---|
| 2,347,379 | 4/1944 | Teeter | 220/85 B |
| 2,851,059 | 9/1958 | Lucien | 138/30 |
| 3,628,690 | 12/1971 | Sherman | 138/30 |
| 3,674,053 | 7/1972 | Murman et al. | 138/30 |
| 3,853,147 | 12/1974 | Cibulka | 138/30 |

FOREIGN PATENT DOCUMENTS

| | | | |
|---|---|---|---|
| 597550 | 5/1960 | Canada | 138/30 |
| 2817011 | 10/1979 | Fed. Rep. of Germany | 138/30 |

*Primary Examiner*—James E. Bryant, III
*Attorney, Agent, or Firm*—Pravel, Gambrell, Hewitt, Kirk, Kimball & Dodge

[57] ABSTRACT

The present invention relates to a surge absorber that may be easily custom fabricated to a particular flow line application. The surge absorber prevents "water hammer" by providing an enlarged compressible fluid chamber that is separated from the flow line by a diaphragm. When the pressure surge occurs, the greater incompressible fluid volume provided by the intermediate tubular section of the pressure vessel housing provides sufficient baffling while an internal diaphragm protector protects the diaphragm from damage by the incompressible fluid.

1 Claim, 1 Drawing Figure

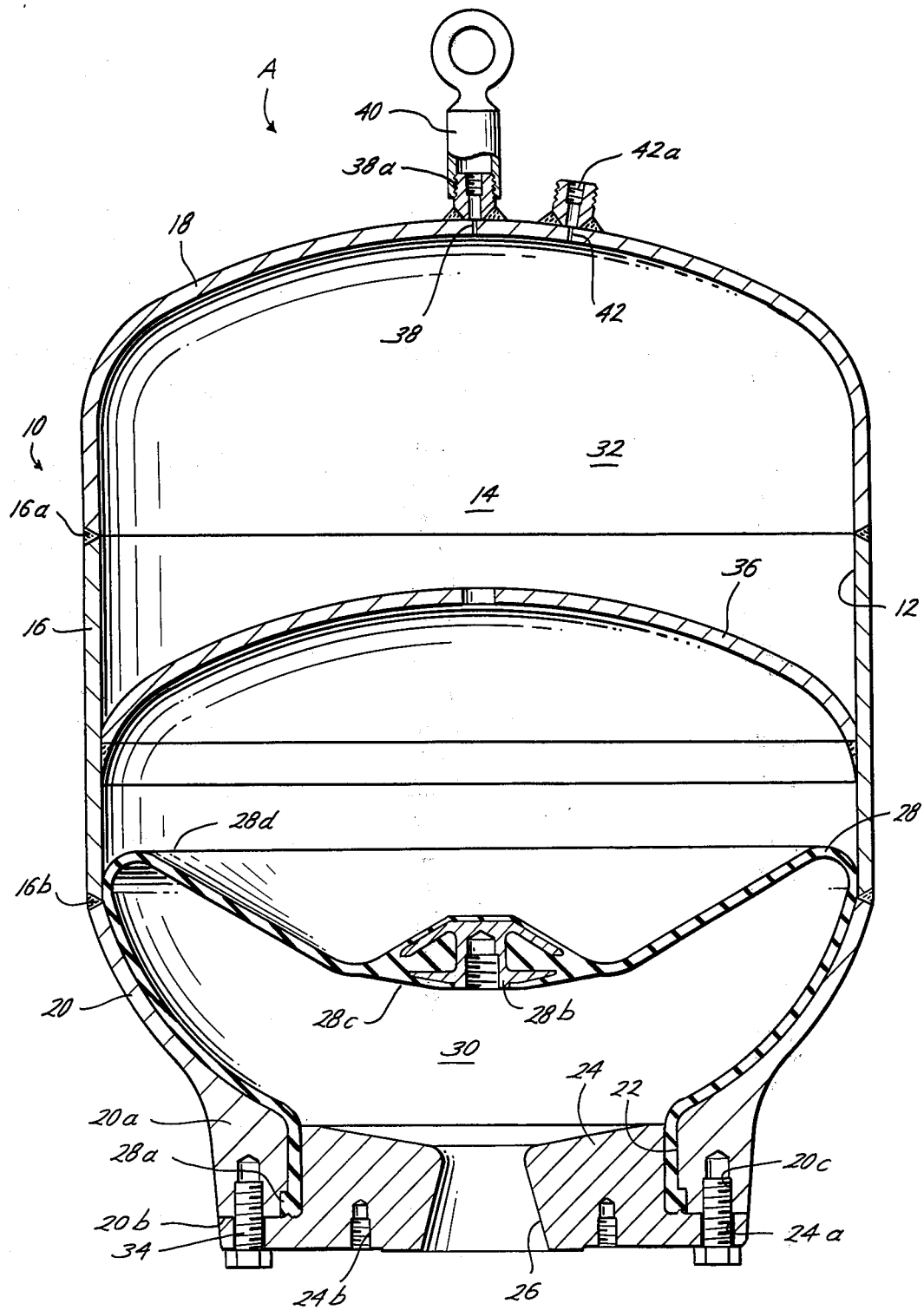

4,305,428

SURGE ABSORBER

TECHNICAL FIELD

This invention relates to surge absorbers and particularly to an improved surge absorber to reduce pressure surge or "water hammer" due to quick closing valves in flow lines.

In the operation of such flow lines or pipelines, the surge absorption requirements are usually predictable and the surge absorber pressure vessel size calculated. Previously, manufacturing considerations have been such that the pressure vessels have not usually been sized for a specific application but rather one or more of a standard size unit was used to produce the required volume or capacity for surge absorption.

BACKGROUND ART

In my patent application, Ser. No. 955,929, filed Oct. 30, 1978, now U.S. Pat. No. 4,186,776, a number of the differences between a pulsation dampener and a surge absorber of the present invention are set forth and which are hereby totally incorporated herein by this reference. In addition, the disclosure of certain prior art United States patents were considered in that patent application. Additional United States patents considered in evaluating the present invention include the following:

| U.S. PAT. NO. | PATENTEE |
| --- | --- |
| Re.23,170 | Beach |
| 2,968,319 | Ball |
| 3,003,522 | Rohacs |
| 3,139,113 | Mercier |
| 3,948,288 | Mayer |
| 3,961,646 | Schon |

DISCLOSURE OF THE INVENTION

The present invention relates to a new and improved surge absorber that may be easily customized or sized to a particular application for protecting flow lines. The surge absorber is provided with an elongated pressure vessel having an intermediate tubular section forming a cavity enclosed by elliptical heads. An elliptical interior support baffle cooperates with one of the elliptical heads for providing movement limit supports for a flexible diaphragm secured in the cavity. The diaphragm separates the cavity into two pressure zones for absorbing pressure surges in one of the zones with a pressurized compressible fluid in the other zone. The elongated vessel construction enables the pressure zone of compressible fluid to be large relative to the zone volume filled by the fluid subject to the pressure surge for providing sufficient surge absorption capacity.

BRIEF DESCRIPTION OF THE DRAWING

The FIGURE is a side view, in section, of a surge absorber built in accordance with the present invention.

BEST MODE FOR CARRYING OUT THE INVENTION

The surge absorber of the present invention is generally designated A in the FIGURE and includes a generally elongated pressure vessel shell 10 having an inner surface 12 defining a central cavity 14. The shell 10 is formed of an intermediate tubular section portion 16 and an upper elliptical head 18 closing the upper opening of the intermediate tubular section 16. A lower elliptical head 20 encloses the lower opening of the tubular member 16 in the usual manner to provide the elongated pressure vessel shell 10. The elliptical heads 18 and 20 are joined to the intermediate tubular member 16 by welds 16a and 16b in the usual manner.

The pressure vessel shell 10 is provided with a first opening 22 in lower elliptical head 20 in which is secured an inlet nozzle 24 having a central flow passage 26 for permitting ingress and egress of fluid having the undesired pressure surges into the cavity 14.

Disposed in the cavity 14 is a flexible diaphragm or bladder 28 for dividing the cavity into an expansible lower or first zone 30 for the pulsating fluid and an upper expansible or second zone 32 for a compressible surge absorbing fluid. The diaphragm 28 is provided with an annular lip 28a for securing and sealing the diaphragm 28 to the pressure vessel shell and the inlet nozzle 24. A plurality of equi-circumferentially spaced bolts 34 secures the inlet nozzle 24 to the lower elliptical head 20 for assisting in holding the collar 28a in sealing and securing engagement between pressure vessel shell 10 and the inlet nozzle 24. Disposed within the pressure vessel cavity 14 is a diaphragm protector 36 having a flow opening 36a formed therethrough. The elliptical diaphragm protector 36 and the lower elliptical head 20 form a cavity controlled by the shape of the diaphragm 28 in that it is desirable that the diaphragm be supported by the pressure vessel wall 12 and the diaphragm protector 36 when the pressure in one of the zones greatly exceeds the other. This prevents a pressure differential from being established across the diaphragm 28 which would lead to premature failure of the diaphragm 28.

The opening 36a in the diaphragm support 36 communicates the upper zone 32 above and below the diaphragm protector in the usual manner. The opening 36 is a relatively small size in order that the center protector 28b of the diaphragm will bridge across the opening 36a when the pressure in the lower zone 30 exceeds the pressure in the upper zone 32 as is well known to those skilled in the art.

The pressure vessel 10 is provided with a second opening 38 communicating with the upper zone 32. The opening 38 is threaded at 38a for receiving a pressure control for admitting and controlling the pressure of the compressible fluid valve thereon. A suitable pressure control valve is a Model No. 798 manufactured by Schroeder Automotive Products Division of Scoville Corporation in Dixon, Tenn. A second opening through the pressure vessel shell 10 is provided at 42 for gage installation if desired. Normally, a pipe plug (not illustrated) may be received in the thread portion 42a of the opening 42 for closing the opening 42 in the usual manner.

The pressure vessel shell 10 is preferably a welded steel construction and provided with a thickened wall portion 20a adjacent the opening 22. The thickened wall section 20a terminates in the downwardly facing annular shoulder surface 20b which engages the inlet nozzle 24. The shoulder 20b is drilled and tapped with a plurality of equi-circumferentially spaced drilled and tapped openings 20c corresponding to the bolt openings 24a of the inlet nozzle 24. The inlet nozzle 24 is provided with another circle of equi-circumferentially spaced drilled and tapped openings 24b corresponding to the bolt openings (not illustrated) on the mating pipe flange F communicating with the flowline having the undesirable pressure surge. In this manner, the surging fluid in the flow line will be communicated into the first zone 30 below the diaphragm 28.

The diaphragm is provided with a first or inner surface 28c that is exposed to the fluid pressure in the lower zone 30 for urging the diaphragm upwardly into engagement with the diaphragm support 36 of the pressure vessel 10 when the pressure in the lower zone 30 exceeds the pressure in the upper zone 32. When the pressure in the upper zone 32 exceeds the pressure in the lower zone 30 the pressure in the chamber 32 will urge on the second or outer surface 28d of the diaphragm 28 for moving the diaphragm 28 to fold back upon itself. Molded in the diaphragm is the bridging disk 28b that covers the inlet opening 26 for supporting the diaphragm 28 when the pressure in the upper zone 32 exceeds pressure in the lower zone 30. The briding disk 28b also serves to bridge across the opening 36a in the diaphragm support 36 when the pressure in the lower zone 30 exceeds the pressure in the upper zone 32.

OPERATION

In the use and operation of the present invention, the surge absorber is assembled in the manner illustrated and secured to a flange (not illustrated) on the flow line where undesirable surges are anticipated. The anticipated pressure surge of course would control the length of the intermediate tubular section 16 that is selected during manufacture and which controls the volume of the zone 32. In absorbing pressure surges, it is only necessary to absorb a small volume of the incompressible flow line fluid to absorb the surge, but a relatively large volume of compressible gas is required. Also due to the requirement of long diaphragm life, the pressure of the compressible fluid is preferably kept as low as possible and therefore will require a much larger volume. By making the upper zone 32 that is filled through the valve with the compressible fluid, usually nitrogen, larger by the use of the intermediate section and the upper elliptical head 18, the volume can be significantly increased and thereby provide for increased absorption capacity, without increasing the size of the diaphragm.

After charging the upper zone 32 with nitrogen to a predetermined pressure, the flow line is placed in communication with the lower zone 30. When a pressure surge occurs in the flow line the lower zone 30 will expand in response to the surge. The increase in volume of the lower zone will further compress the nitrogen in the upper zone 32 for absorbing the pressure surge.

The foregoing disclosure and description of the invention are illustrative and explanatory thereof, and various changes in the size, shape and materials as well as in the details of the illustrated construction may be made without departing from the spirit of the invention.

I claim:

1. A surge absorber apparatus adapted for use on flow lines to protect against undesired pressure surges in an incompressible fluid contained within the flow line, including:

an elongated pressure vessel forming a cavity for receiving and containing fluid under pressure in said cavity, said pressure vessel having a first opening and a second opening formed therethrough, said elongated pressure vessel comprising an intermediate tubing section having a first open end and a second open end and a first pressure head enclosing said first open end and a second pressure head enclosing said second open end;

an inlet nozzle disposed in said first opening and having a flow passage for permitting ingress and egress of fluid subject to the undesired pressure surges from said cavity through said flow passage;

a flexible diaphragm disposed in said cavity for separating said cavity into a first variable volume zone for receiving a first fluid and a second variable volume zone for receiving a second fluid, said first zone communicating with said flow passage of said first inlet nozzle, said diaphragm sealed with said inlet nozzle to prevent contact of the fluid in the flow line subject to pressure surges with the elongated pressure vessel;

said second opening communicating with said second zone;

means operably mounted with said pressure vessel for controlling the compressible fluid pressure in said second zone;

means formed on said pressure vessel for securing said pressure vessel with a conduit having the fluid subject to undesired pressure changes for communicating the fluid subject to the undesired pressure changes through said flow passage of said inlet nozzle to said first zone; and a perforated diaphragm protector mounted with said intermediate tubing section and disposed in said cavity for defining the maximum volume limit of said first zone in said cavity and for supporting said diaphragm when the fluid pressure in said first zone exceeds the pressure in said second zone, said diaphragm protector comprising an elliptical head having a flow restricting opening for controlled communication of compressible fluid within said second zone of said cavity, said intermediate tubing section controlling the maximum volume limit of said second zone to insure proper sizing of the surge absorber apparatus.

* * * * *